(No Model)
J. COTTET, Jr.
EYEGLASSES.
No. 585,619. Patented June 29, 1897.
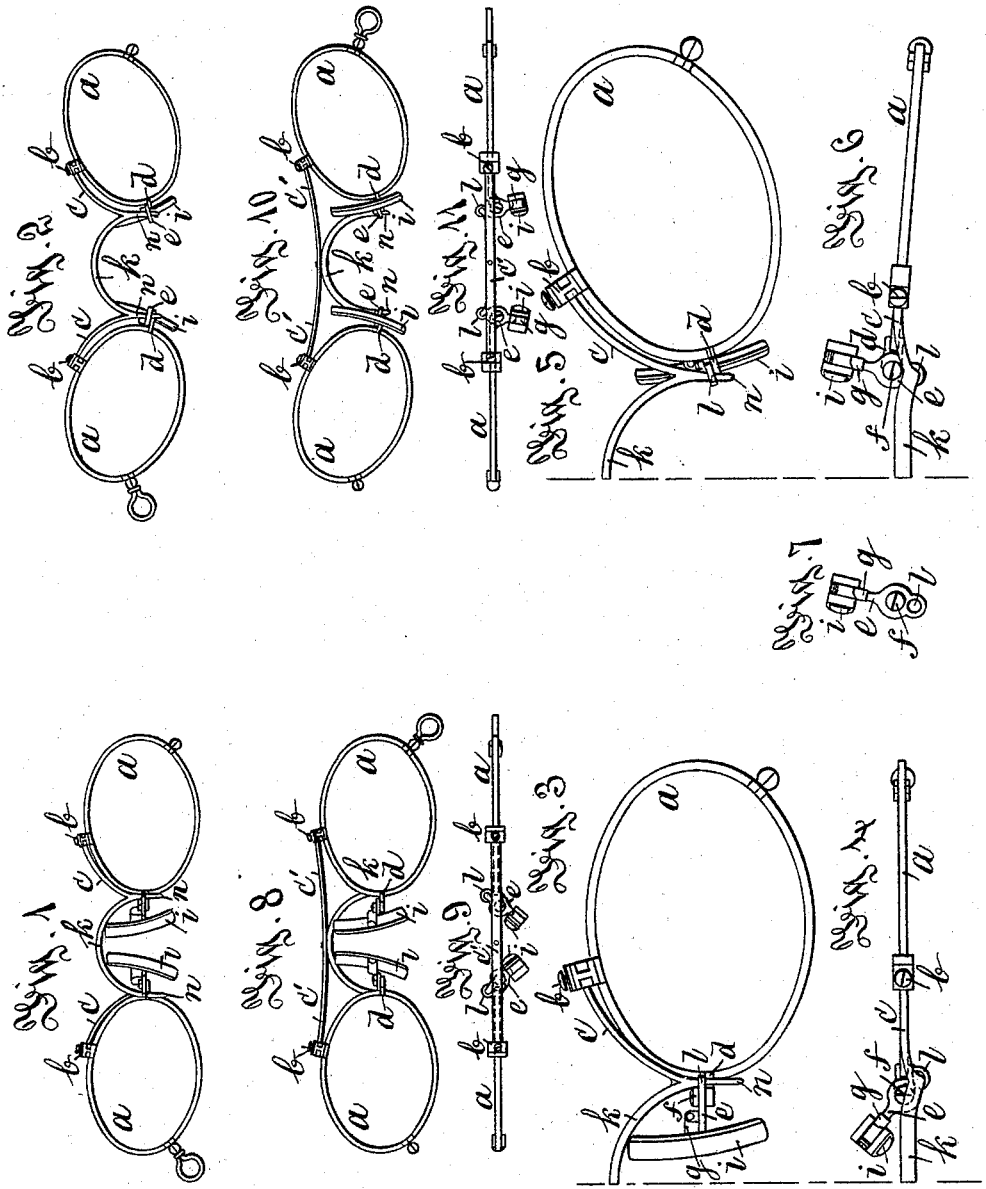
Witnesses:
J. Stephen Giusta
John R. Wilson
Inventor:
Jules Cottet, Jr.
by Whitman & Wilkinson
Attys

UNITED STATES PATENT OFFICE.

JULES COTTET, FILS, OF MOREZ, FRANCE, ASSIGNOR TO GEORGE CULVER, OF LONDON, ENGLAND.

EYEGLASSES.

SPECIFICATION forming part of Letters Patent No. 585,619, dated June 29, 1897.

Application filed March 1, 1897. Serial No. 625,652. (No model.) Patented in England December 10, 1895, No. 23,673; in Germany February 25, 1896, No. 89,229, and in France June 3, 1896, No. 252,481.

*To all whom it may concern:*

Be it known that I, JULES COTTET, Fils, a citizen of the Republic of France, residing at Morez, Department du Jura, France, have invented a new and useful Improvement in Eyeglasses or Pince-Nez, (for which I have obtained patents in Great Britain, No. 23,673, bearing date December 10, 1895; in Germany, No. 89,229, dated February 25, 1896, and in France, No. 252,481, dated June 3, 1896,) of which the following is a specification.

My invention relates to eyeglasses or "pince-nez," the glasses of which are connected by a flexible spring, so that they can be brought together or opened out and separated; and the objects of my improvement are to cause plates or supports by which the glasses are held upon the nose to move automatically out of the way when the glasses are separated and to come together and press upon the nose in the required position when the glasses are released and brought together. I attain these objects by the mechanism illustrated in the accompanying drawings, in which—

Figure 1 is a front elevation of a pair of my improved eyeglasses, showing the plates or supports brought together to press against the nose; Fig. 2, a similar view showing the plates or supports separated in order to fit them upon the nose; Fig. 3, a front view, upon a larger scale, of one-half of the glasses shown in Fig. 1; Fig. 4, a plan from above of Fig. 3; Fig. 5, a front view, upon a larger scale, of one-half of Fig. 2; Fig. 6, a plan from above of Fig. 5; Fig. 7, a separate view of the arm carrying the plate or support shown in Fig. 6. Fig. 8 is a front view of a somewhat different form of construction from that shown in Fig. 1. Fig. 9 is a plan of Fig. 8. Fig. 10 is a front view of the glasses shown in Fig. 8, but with the plates or supports for the nose separated; and Fig. 11 is a plan of Fig. 10.

Similar letters refer to similar parts throughout the several views.

$a$ $a$ are two elliptical lens rings or frames of the usual kind, carrying the lenses and connected to a rigid central semicircular bar or bridge-piece $k$ by flexible springs $c$ $c$, which form part of or are attached at their inner ends to the sides of the said rigid bridge-piece $k$, while their outer ends are firmly attached at $b$ to the rings $a$, as shown in Figs. 1, 2, 3, 4, 5, and 6. The rings $a$ $a$ are also provided with brackets $d$, upon which are pivoted by means of screws or pivots $f$ a pair of swinging arms or levers $e$. (Shown separately in Fig. 7.) These arms or levers $e$ project outwardly for a short distance and are provided at one end with eyes $l$, in which fit freely a pair of downward prolongations $n$ of the rigid semicircular bridge-piece $k$, forming fixed pivots, upon which said lever-arms $e$ turn. The opposite ends of the lever-arms $e$ are prolonged and fitted with suitable curved plates or supports $i$, adapted to press against and grasp the nose of the wearer. These plates $i$ turn upon pivots $g$ at the end of the arms $e$, round which they can move through a slight angle, so as to allow them to adjust themselves more perfectly upon the nose.

The action of the devices described and shown in Figs. 1, 2, 3, 4, 5, and 6 is as follows: The eyeglasses are normally in the closed position shown in Figs. 1, 3, and 4, but when it is desired to fit them upon the nose of the wearer the lens-rings $a$ $a$ are bent outward and up, as shown in Fig. 2, the flexible springs $c$ $c$ allowing such movement.

As the bridge-piece $k$ is rigid, the lever-arms $e$ turn about the prolongations $n$ on said bridge-piece as a fulcrum or pivot, and accordingly as the lens-frames are separated from each other the ends of the lever-arms $e$ are moved a more or less great distance apart, as shown in Figs. 2 and 5. The eyeglasses are then adjusted upon the nose and the lens-frames $a$ $a$ released, and the elasticity of the springs $c$ $c$ then brings the frames together, and with them the plates or supports $i$, which are then firmly held upon the nose. The leverage of the arms $e$ is so great that a very small separation of the lens-frames is sufficient to widely separate the pressure-plates $i$. The lower ends of the pivots $n$ may be bent to the shape of hooks.

In Figs. 8, 9, 10, and 11 a slightly-modified form of construction is shown, in which, instead of the curved springs $c\ c$ forming part of or attached to the rigid semicircular bar $k$, a flat spring or wire $c'$ is used, attached at its center to the semicircle $k$ and at its ends to the lens-frames $a\ a$. The action of the apparatus is otherwise the same as in the arrangement first described.

The other parts of the improved eyeglasses are similar to those ordinarily used and may be made of any suitable material.

I am aware that prior to my invention eyeglasses or pince-nez have been made in which the frames of the lenses have been provided with pressure-plates for the nose, and I do not claim such a construction broadly; but What I do claim as my invention, and desire to secure by Letters Patent, is—

1. In eyeglasses or pince-nez, the combination of a rigid bridge-piece; springs attached to said bridge-piece, and carrying the lens-frames; a pair of arms having eyes at one end pivoted upon continuations of the said bridge-piece; nose-plates carried upon the opposite ends of the said arms; and brackets upon the lens-frames upon which said arms are pivoted, substantially as described.

2. In eyeglasses or pince-nez, the combination of a pair of lens-frames; a rigid bridge-piece; flexible connections between the said lens-frames and said bridge-piece; a pair of arms carrying the nose-pieces, pivoted upon the said lens-frames, and pivotally connected to prolongations of the said rigid bridge-piece, substantially as described.

3. In eyeglasses or pince-nez, the combination of lens-frames; a spring connection between said lens-frames; a bridge-piece; levers pivoted upon said lens-frames; nose-plates mounted upon said levers; and an operative connection between the bridge-piece and said levers, substantially as described.

In testimony whereof I have hereunto set my hand in the presence of two witnesses.

JULES COTTET, Fils.

Witnesses:
D. FERRAD,
M. CRESTIN.